United States Patent
Heller et al.

(10) Patent No.: US 7,085,682 B1
(45) Date of Patent: Aug. 1, 2006

(54) SYSTEM AND METHOD FOR ANALYZING WEBSITE ACTIVITY

(75) Inventors: Jonathan Marc Heller, New York, NY (US); James Christopher Kim, New York, NY (US); Dwight Allen Merriman, New York, NY (US); Andrew Joel Erlichson, Metuchen, NJ (US); Benjamin Chien-wen Lee, Bayside, NY (US)

(73) Assignee: Doubleclick Inc., New York, NY (US)

( * ) Notice: Subject to any disclaimer, the term of this patent is extended or adjusted under 35 U.S.C. 154(b) by 93 days.

(21) Appl. No.: 10/245,580

(22) Filed: Sep. 18, 2002

(51) Int. Cl.
*H04N 7/16* (2006.01)
(52) U.S. Cl. ..................................................... 702/186
(58) Field of Classification Search ............... 702/186, 702/178; 707/102, 101, 9, 203; 705/17, 705/14, 10, 26, 29, 9; 329/265; 709/224, 709/219, 283, 203, 218, 213, 217; 713/200; 434/238; 345/716; 725/9; 455/67
See application file for complete search history.

(56) References Cited

U.S. PATENT DOCUMENTS

| | | | |
|---|---|---|---|
| 6,539,392 B1 * | 3/2003 | Rebane ........................ 707/101 |
| 2002/0087679 A1 * | 7/2002 | Pulley et al. ................ 709/224 |
| 2003/0115586 A1 * | 6/2003 | Lejouan et al. ................. 725/9 |
| 2004/0015580 A1 * | 1/2004 | Lu et al. ....................... 709/224 |

* cited by examiner

*Primary Examiner*—John Barlow
*Assistant Examiner*—Tung S. Lau
(74) *Attorney, Agent, or Firm*—Kenyon & Kenyon LLP

(57) ABSTRACT

A method and system for analyzing website activity. According to an example embodiment, the system receives event-level data representing visitor session activity on a client website; attributes characteristic information of the event-level data associated with each visitor's session to at least one of a plurality of visitor segments, stores results of the attributed information aggregated according to visitor segment prior to a client-requested analysis of the event-level data, and provides online reports based on the resultant data in response to a client-requested analysis of the event-level data.

17 Claims, 15 Drawing Sheets

FIG. 12

SYSTEM AND METHOD FOR ANALYZING WEBSITE ACTIVITY

CROSS-REFERENCE TO RELATED APPLICATIONS

This application is related to U.S. patent application entitled "System and Method for Reporting Website Activity Based on Inferred Attribution Methodology", filed Sep. 18, 2002, which is hereby incorporated by reference in its entirety.

Copyright Notice

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The increase in electronic commerce over the Internet has resulted in a growing demand for websites to track their online customers' behavior and activity while at their sites. Tracking this activity enables the websites to better understand their customers, which provides insight into ways in which the websites' service and/or offerings can be improved. Websites can track this information on their own, but larger sites enlist the aid of third party application software or a third party application service provider ("ASP") to do the work for them.

Tracking customer activity generally entails storing event-level data to a log file. Event-level data represents specific events that describe a customer's presence and/or activity at a website, such as clicking on a specific web page or buying a specific product. After a certain period of time, an ASP, for instance, may analyze the event-level data in the log file according to desired metrics (e.g., total revenue, top requested web pages, etc.) and the results are provided to the client website in the form of a report. Some web-based ASPs provide this analysis to the client via interactive reports accessible through the client's web browser. The interactive element of the report allows the client to view a desired analysis by altering the report parameters in real time.

A major drawback to this process is the cost associated with the processing, storage and maintenance of the log files, which can be quite large for client websites with high traffic volume. Each time a client requests a particular analysis of the event-level data through their web browser interface, the ASP has to perform the requested analysis on the entire set of data in the log file, most of which is not relevant to the requested analysis.

Some ASPs have attempted to control this cost by reducing the size of the log file before analysis is fully performed on the data. Such reduction typically involves a simple deletion of all data not associated with a particular metric, such as the top web pages visited or the top products sold on the site. Although this may reduce the size of the log file somewhat, it discards data that may be relevant to a second and separate analysis requested by the client. And this data reduction implementation does not address the expensive cost in processing time associated with performing each analysis on the entire set of event-level data, even if the size of the log file is somewhat reduced.

Accordingly, there is a need in the art for a system and method for cost-effective and efficient analysis of online customer activity and behavior at a website without sacrificing information relevant to the analysis.

SUMMARY OF THE INVENTION

The present invention is directed to a system and method for analyzing online customer activity at a website in a cost-effective and efficient manner. Efficient data collection, processing, storage and report presentation processes enable client websites to quickly access and understand the interaction between site traffic and transactions, while bringing all the necessary information together and producing the answers needed for marketing, merchandising, site usability, customer intelligence and e-commerce P&L Management.

According to an example embodiment, the system receives event-level data representing visitor session activity on a client website; attributes characteristic information of the event-level data associated with each visitor's session to at least one of a plurality of visitor segments, stores results of the attributed information aggregated according to visitor segment prior to a client-requested analysis of the event-level data, and provides online reports based on the resultant data in response to a client-requested analysis of the event-level data.

BRIEF DESCRIPTION OF THE DRAWINGS

FIG. 12 is a screen shot of a Top Selling Products analysis page in accordance with an embodiment of the present invention.

DETAILED DESCRIPTION

Overview

Figure 1:
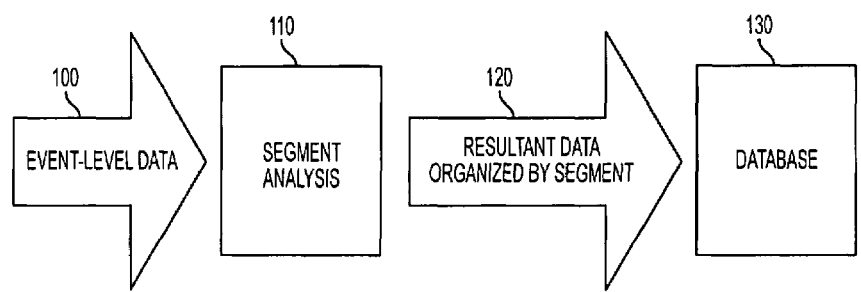
FIG. 1 is a block diagram that depicts the nature and flow of data through an analysis system in accordance with an embodiment of the present invention.

FIG. 1 provides an overview of a process and system according to an embodiment of the present invention. The system receives event-level data 100, which represents online activity of a customer visiting a client website. Upon receipt of event-level data 100, the system performs segment analysis 110 on event-level data 100, transforming it into resultant data organized by segment 120 which is stored in database 130. Resultant data 120 comprises the sparse data used to provide a report on a client-requested analysis according to one or more metrics, and is organized by various segments (e.g., visitor segments, such as "one-time customer" or "repeat customer") for efficient storage and later retrieval.

Architecture

Figure 2:
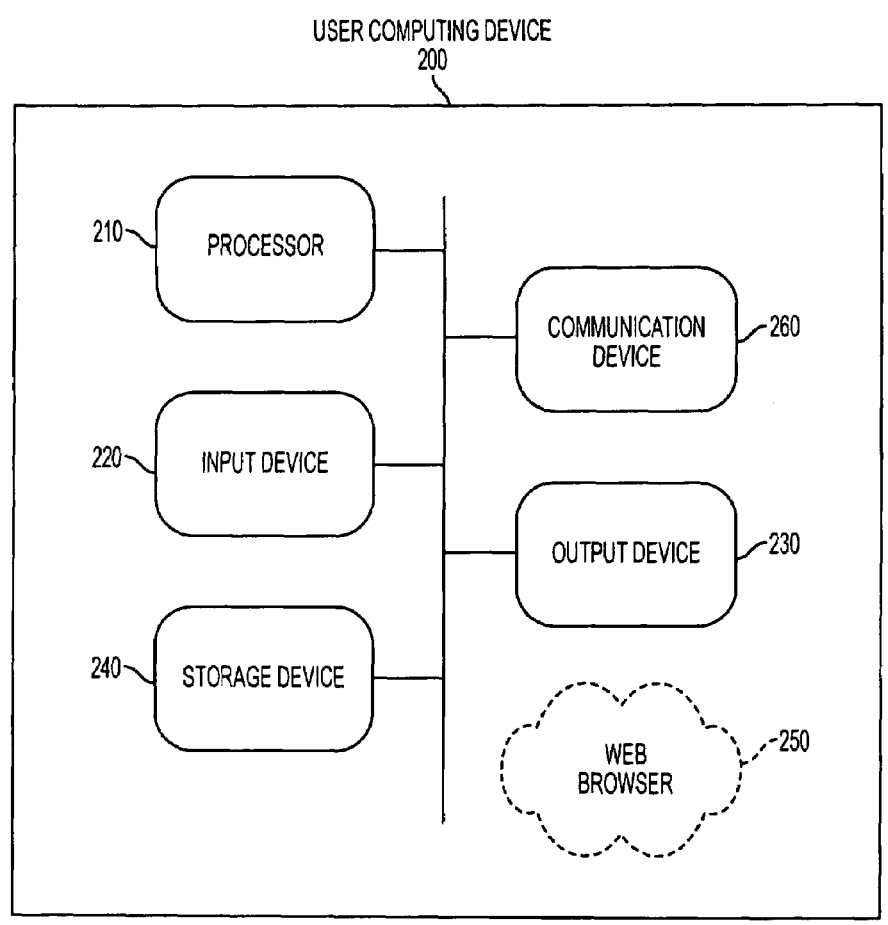
FIG. 2 is a block diagram that depicts a user computing device in accordance with an embodiment of the present invention.

FIG. 2 is a block diagram depicting the internal structure of user computing device 200 in accordance with an embodiment of the present invention. User computing device 200 may be a personal computer, handheld personal digital assistant ("PDA"), or any other type of microprocessor-based device. User computing device 200 may include a processor 210, input device 220, output device 230, storage device 240, web browser 250, and communication device 260.

Input device 220 may include a keyboard, mouse, pen-operated touch screen, voice-recognition device, or any other device that provides input from a user. Output device 230 may include a monitor, printer, disk drive, speakers, or any other device that provides tangible output to user.

Storage device 240 may include volatile and nonvolatile data storage. Volatile data storage includes RAM, a cache, or any storage medium that temporarily holds data while being processed; nonvolatile data storage includes a hard drive, CD-ROM drive, tape drive, removable storage disk, or any other non-temporary storage medium. Communication device 260 may include a modem, network interface card, or any other device capable of transmitting and receiving signals over a network.

Web browser 250, which may be stored in storage device 240 and executed by processor 210, may include Internet Explorer by Microsoft Corp. or Communicators by Netscape Communications Corp., or any other software program that displays data from a web server to a user via output device 230. One skilled in the art would appreciate that the components of user computing device 200 may also be connected wirelessly, possibly through an infrared connection.

Figure 3:
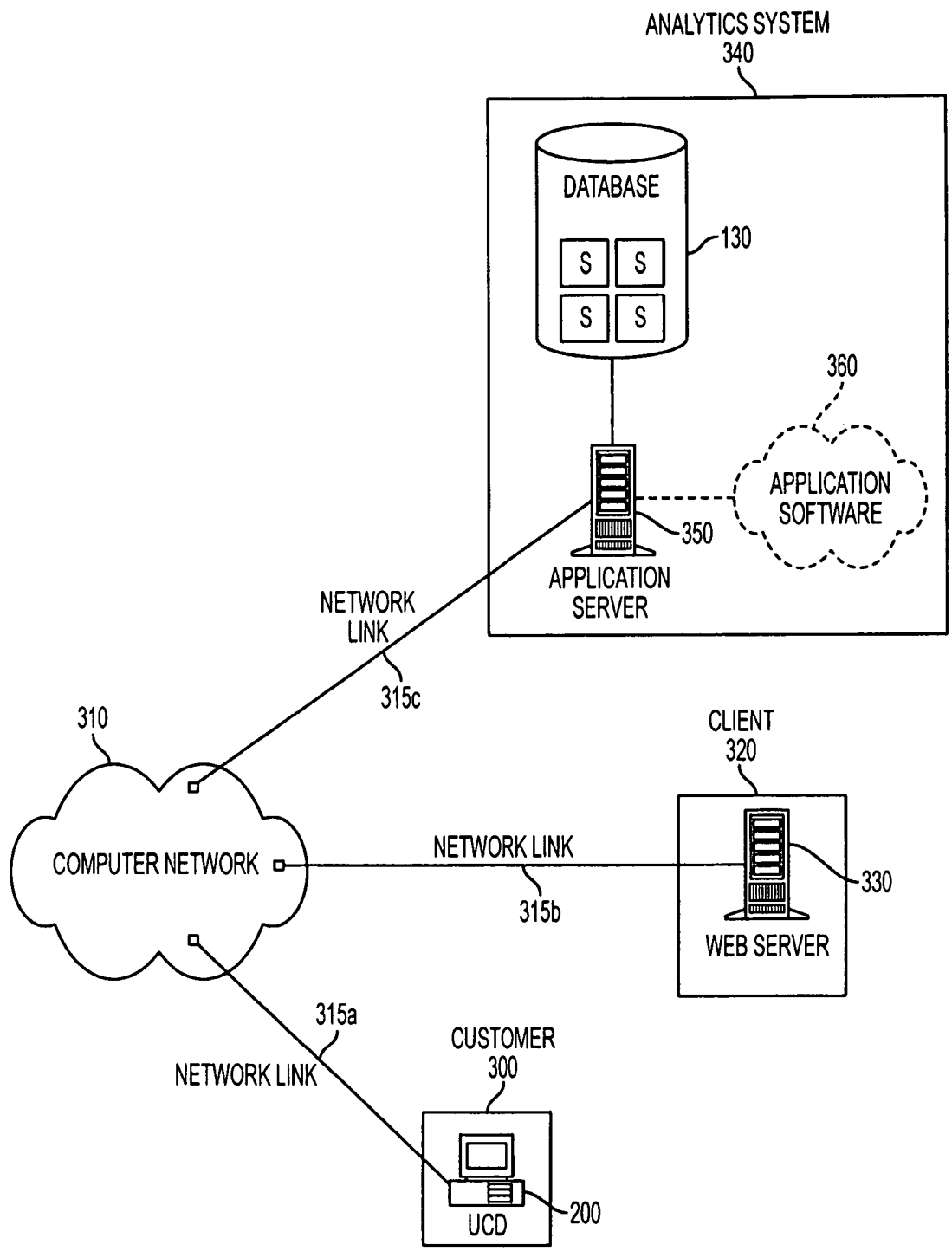
FIG. 3 is a block diagram that depicts a network architecture for an analysis system in accordance with an embodiment of the present invention.

FIG. 3 is a block diagram depicting a network architecture for an analysis system in accordance with an embodiment of the present invention. According to one particular embodiment, when customer 300 visits the website of client 320, user computing device 200 sends and receives via web browser 250 HTTP ("Hypertext Transport Protocol") requests (or any similar protocol requests) to and from web server 330 via network link 315a, computer network 310, and network link 315b. As customer 300 proceeds through client 320's website, web server 330 sends information about customer 300's online activity to application server 350 of analytics system 340 (via network link 315b, computer network 310 and network line 315c). After receiving this information (e.g., event-level data 100), application server 350 employs application software 360 to perform segment analysis 110, which stores resultant data 120 in database 130 (the boxes in database 130 marked "S" each represent resultant data 120 pertaining to a particular segment). Application software 360 also provides interactive reports (as shown in FIGS. 7 and 9–16) to client 320 on client-requested analysis through client 320's web browser (not shown).

Network link 315 may include telephone lines, DSL, cable networks, T1 or T3 lines, wireless network connections, or any other arrangement that provides a medium for the transmission and reception of computer network signals. Computer network 310 may include a wide-area network ("WAN"), such as the Internet, and a local-area network ("LAN"), such as an intranet or extranet. It should be noted that, technically, user computing device 200, network link 315, web server 330, application server 350 and any intermediate network components, such as Internet service providers and routers (not shown), are also part of computer network 310 because of their connectivity.

Computer network 310 may implement any number of communications protocols, including TCP/IP ("Transmission Control Protocol/Internet Protocol"). The communication between UCD 200, web server 330 and application server 350 may be secured by any Internet security protocol, such as SSL ("Secured Sockets Layer").

Web server 330 and application server 350 each include a processor and memory for executing program instructions, as well as a network interface (not shown), and may include a collection of servers working in tandem to distribute the network functionality and load. In one particular embodiment, application server 320 may include a combination of enterprise servers such as a web application server, a web user interface server and a database server, all of which could be manufactured by Sun Microsystems, Inc. The web server (of analytics system 340 as well as web server 330) could run an HTTP server program in one embodiment, such as Apache®, as a process under an operating system such as UNIX® (or any variant thereof). Database 130 may be part of a relational database program, such as MySQL® or Oracle®, that may be run as a process by a database server within the UNIX® operating system, for example.

Application software 330 may take the form of custom-written programs and libraries that run, either interpreted or compiled, in part as a result of HTTP requests received by application server 320. These programs may be written in any programming language, such as C, C++, or PERL ("Practical Extraction and Reporting Language"), and they may generate an HTML ("Hypertext Markup Language") client interface of analytics system 340. Application software 360 may be built on a web-based enterprise application platform, such as J2EE® ("Java 2 Platform, Enterprise Edition").

Tagging

In one example embodiment of the present invention, Web server 330 tracks and sends customer 300's online activity to application server 350 through the use of IMG tags placed on certain pages of client 320's website. The IMG tag is an HTML image request for a 1×1 pixel GIF from application server 350, and includes key-value pairs that are used to pass event-level data 100 to application server 350.

For example, each IMG tag may include key-value pairs to capture data about such events as identification of the client site hosting the visitor, the web pages that the visitors (e.g., customer 300) view, the web pages where the visitors place products in their shopping carts, and where the visitors came from before they viewed a tagged web page. The following is an example such an IMG tag (with key-value pairs highlighted in bold):

<img src='http://client.rpts.net/activity;src=12; ord=12121212?;pg nm=Home+Page;sect=Home+Page;pgurl=http://www.client.com/Default.a sp?; ref=http://search.yahoo.com/bin/ search?p=client.com'>

(Note that, for readability purposes, the above example code has left out URL encoding that may be applied to non-alphanumeric characters in a working embodiment.) In the above tag, "src" is the key for the client site ID (with value "12"), "ord" is the key for a random number used to defeat inadvertent duplicate page loads (with value "12121212"), "pgnm" is the key for the name of the current web page, provided by client 320 (with value "Home+Page"), "sect" is the key for the name of the website section to which the current web page belongs, also provided by client 320 (with value "Home+Page"), "pgurl" is the key for the URL of the current web page (having value "http://www.client.com/Default.asp?"), and "ref" is the key for the referring URL of the current web page (with value "http://search.yahoo.com/bin/search?p=client.com").

Of course, additional data may be supplied using additional keys. Other key-value pairs may be utilized to provide information about a product clicked on by a visitor (via a product identifier value), a product placed into a shopping cart, a product converted (i.e., purchased after being placed in a shopping cart), visitor segment membership and custom information. Client 320 may upload a product information file (e.g., including product identifier, name and category) to application server 350 so that application software 360 can match a product identifier in the IMG tag with the actual product information for reporting purposes.

Segments

Figure 4:
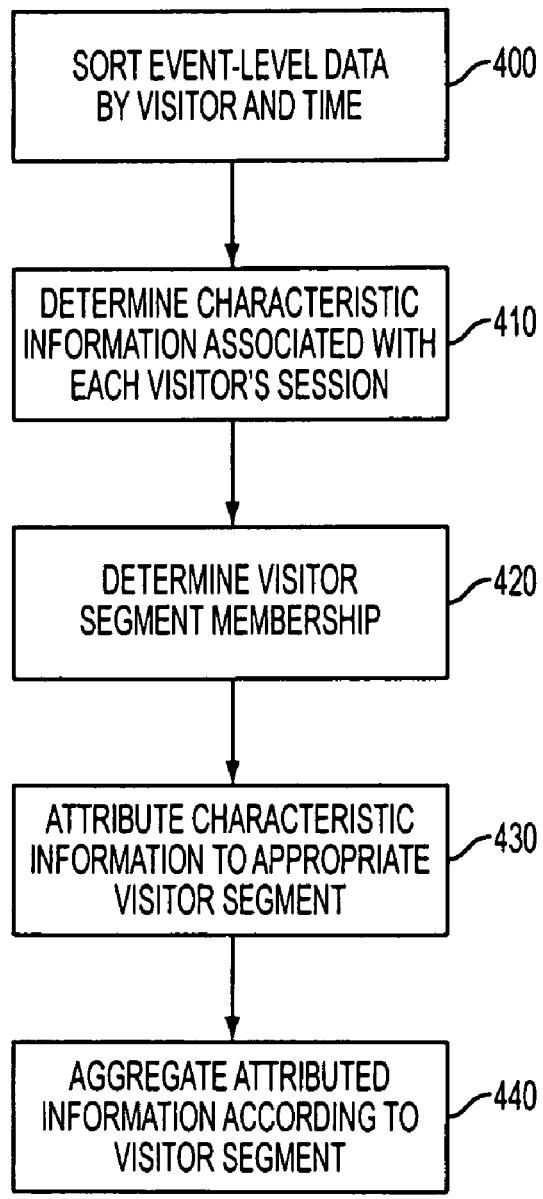
FIG. 4 is a flow chart that illustrates a segment analysis in accordance with an embodiment of the present invention.

The event information automatically sent to application server 350 from web server 330 through the IMG tag functionality (i.e., event-level data 100) may be collected in a log file by application server 350. When the time arrives to analyze event-level data 100 (e.g., once a day), application software 360 performs segment analysis 110 on the data, as shown in FIG. 4. This embodiment presumes that client 320 desires the reported data to be organized by the various types of customers that have visited its website (i.e., visitor segments).

According to an embodiment of the present invention, application software 360 may commence segment analysis 110 by sorting the events from the log file of event-level data 100 by visitor and time received by analytics system 340 (step 400). This sort causes all events associated with each visitor during each visitor's session to be listed in chronological order, grouped by visitor. A visitor's session may be defined as any sequence of events that occur within a certain period of time (e.g., 30 minutes) of one another, and ending after a completed purchase. Further, application software 360 may rely on it own "cookie" information, passed to application server 350 from each visitor's web browser 250 during an IMG tag request, in order to determine which events have originated from the same visitor (assuming, of course, that the visitor has not opted out of client 320's analytics system 340 cookie, is not behind a proxy server which automatically blocks cookies, or has not disabled receiving cookies via the browser's settings).

Application software 360 next determines characteristic information associated with each visitor's session (step 410). To illustrate by means of a simple example, one particular metric that analytics system 340 may wish to report to client 320 is the total revenue generated by client 320's website associated each type of visitor segment. To accomplish this, application software 360 determines from each visitor's event information the total revenue per session, and stores the resulting revenue figure with its corresponding visitor identifier (from the cookie) in a first temporary table. Also determined and stored with its corresponding visitor identifier is whether or not the visitor made a purchase during the visitor's session, a fact useful for the next step in segment analysis 110.

Figure 5:
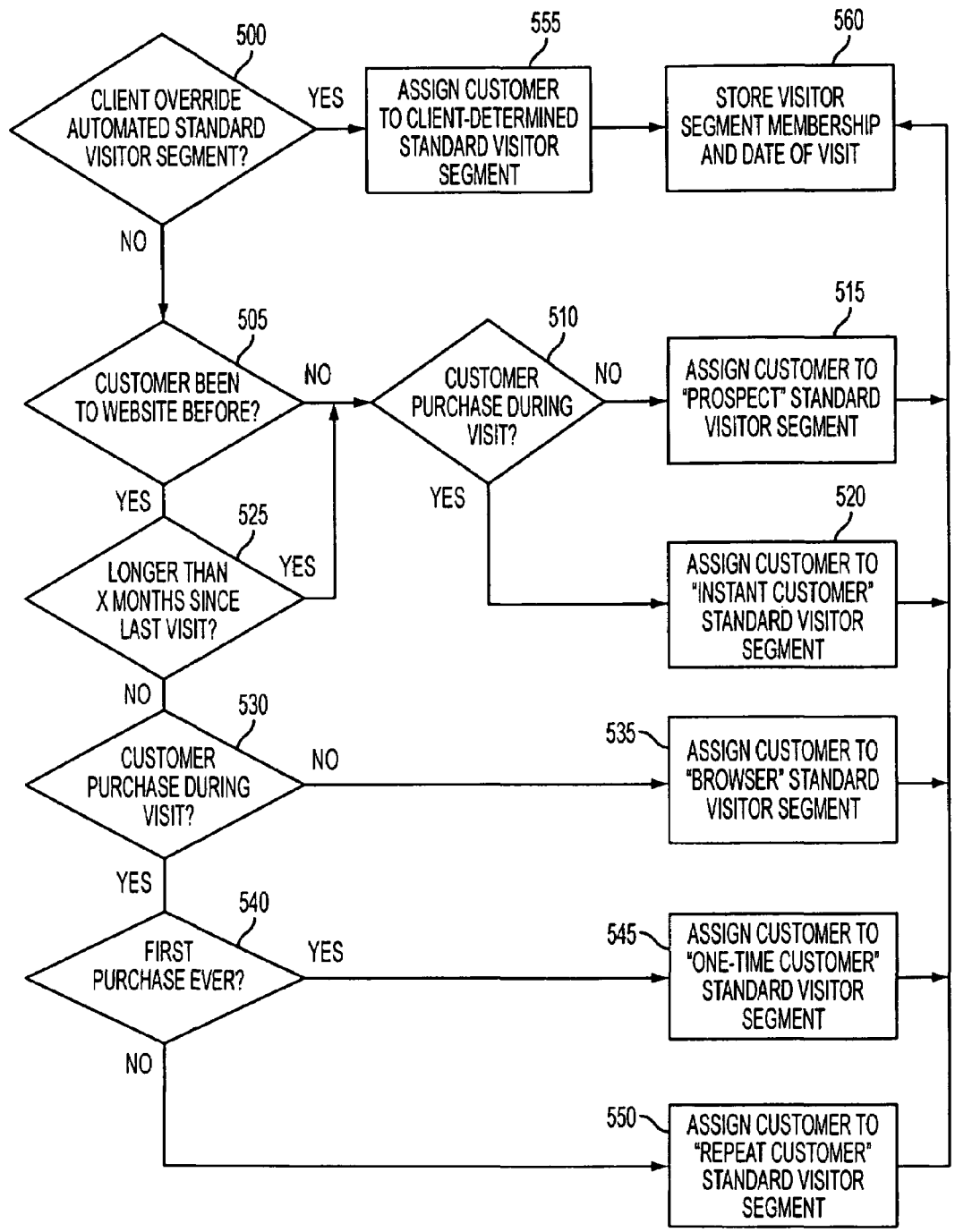
FIG. 5 is a flow chart that illustrates a process for determining standard visitor segment membership in accordance with an embodiment of the present invention.
Figure 6:
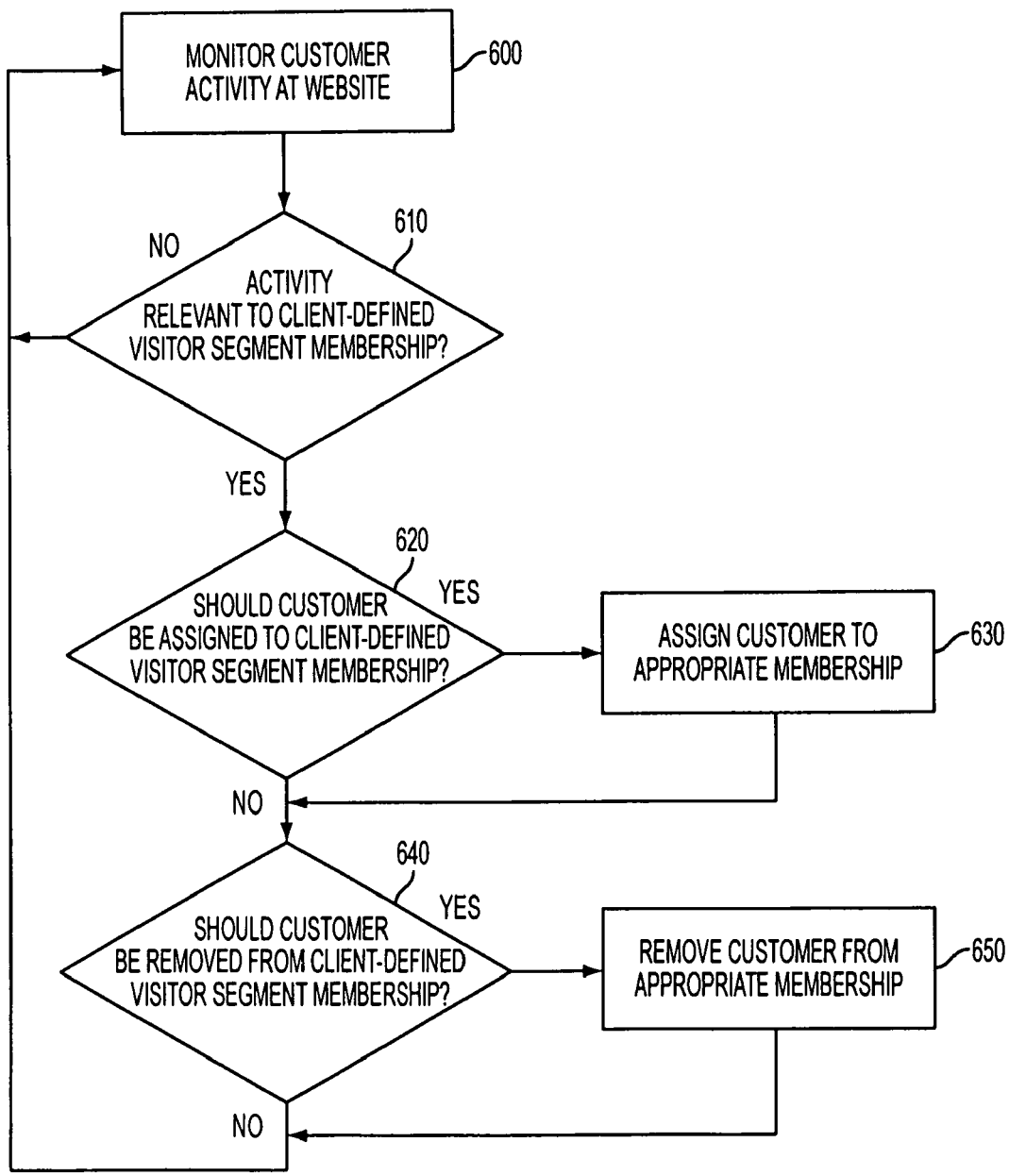
FIG. 6 is a flow chart that illustrates a process for determining client-defined visitor segment membership in accordance with an embodiment of the present invention.

In the next step of the analysis, application software 360 determines visitor segment membership for each visitor (step 420), either standard (see FIG. 5) and/or client-defined (see FIG. 6). According to an example embodiment, each event can be associated with one of five standard visitor segments ("prospect", "instant customer", "browser", "one-time customer", and "repeat customer"), in addition to any number of client-defined visitor segments (e.g., visitors who live within 20, 50, 100 and 200 miles of the physical store).

FIG. 5 illustrates the determination of standard visitor segment membership. First, application software 360 determines if client 320 has overridden the automated standard visitor segment process (step 500). Client 320 may override the process by adding a key-value pair in an IMG tag during a visitor's session that identifies the particular standard visitor segment to which the visitor belongs. If so, application software 360 assigns the visitor to the client-determined standard visitor segment (step 555) by storing the appropriate segment membership information, along with the visitor's identifier and date of visit, to a visitor state table (step 560). The visitor state table is used to keep a running tally of each visitor's current segment membership and date of last visit.

In the event client 320 has not overridden the automated standard visitor segment process, application software 360 determines whether the visitor has visited client 320's website in the past (step 505) by checking the visitor state table. If the visitor has not visited client 320's website in the past (i.e., no previous entry for the visitor in the visitor state table), then application software 360 determines whether the visitor purchased something during the visit (step 510) by checking the visitor's entry in the first temporary table. If not, the visitor is assigned to the "prospect" standard visitor segment (step 515). If so, the visitor is assigned to the "instant customer" standard visitor segment (step 520). If the visitor has been to the website before (an entry exists for the visitor in the visitor state table), but longer than a client-defined period of time, such as, e.g., a number of months ago (as determined by checking the corresponding date of visit entry in the visitor state table), then application software 360 treats the visitor as if this were the visitor's first visit to the website (step 525).

If the visitor has been to the website before, and within the client-defined period of time, then application software 360 determines whether the visitor purchased something during the visit (step 530) by checking the visitor's entry in the first temporary table. If not, the visitor is assigned to the "browser" standard visitor segment (step 535). If so, application software 360 determines whether this is the visitor's first purchase at the website (step 540) by checking the visitor's entry in the visitor state table. If so (i.e., visitor's previous visitor segment is "browser"), the visitor is assigned to the "one-time customer" standard visitor segment (step 545), and if not (i.e., visitor's previous visitor segment is either "one-time customer" or "repeat customer"), the visitor is assigned to the "repeat customer" standard visitor segment (step 550).

Each of the automated standard visitor segment membership assignments are similarly performed by storing the appropriate segment membership information, along with the visitor's identifier and date of visit, to the visitor state table (step 560).

FIG. 6 illustrates the determination of client-defined visitor segment membership. First, client 320 monitors customer activity at its website (step 600), such as the visitor visiting the website from a pre-defined external site, browsing a specific page of the website, registering on the site, creating a wishlist, browsing, carting or buying a specific product, using onsite search, and/or visiting the website accompanied by client 320 knowing certain information about the visitor. Client 320 then determines whether particular customer activity is relevant to a client-defined visitor segment membership (step 610). For example, if the visitor registers on the website and provides a home address, then client 320 knows that this activity is relevant to a client-defined visitor segment membership based on, for example, the visitor's proximity to the client's physical store.

If such activity is relevant, client 320 then determines whether the visitor should be assigned to the appropriate client-defined visitor segment membership (step 620). If so (e.g., the visitor lives within the required proximity), the visitor is assigned to the appropriate client-defined visitor segment membership (step 630) by adding a key-value pair in an IMG tag during the visitor's session that identifies any client-defined visitor segment to which the visitor belongs. If not, client 320 then determines whether the visitor should be removed from the appropriate client-defined visitor segment membership (step 640). If so (e.g., the visitor formerly lived within the required proximity, but changed addresses and now lives outside the required proximity), the visitor is removed from the appropriate client-defined visitor segment membership (step 650) by adding a key-value pair in an IMG tag during the visitor's session that identifies any client-defined visitor segment from which the visitor is to be removed. If not, client 320 returns to monitoring customer activity at the website (step 600).

When application server 350 receives client-defined membership assignments or removal instructions via the corresponding IMG tag requests, application software 360 stores the appropriate visitor segment membership to the appropriate entry in the visitor state table (step 560).

Returning to segment analysis 110 in FIG. 4, now that the visitor segment memberships are determined (step 420), application software 360 attributes the characteristic information (e.g., total revenue) to the appropriate visitor segments (step 430) by creating temporary tables, one per visitor segment, that house the characteristic information as applied to its corresponding visitor identifier according to visitor segment. This is accomplished through a straightforward cross-referencing of the first temporary table with the visitor state table. For example, one temporary table would include, for all one-time customers, a listing of their total revenue per sessions, while another temporary table would include, for all repeat customers, a listing of their total revenue per sessions, etc.

The last step in segment analysis 110 comprises aggregating the attributed information according to visitor segment (step 440). In other words, the totality of the session-level characteristic information for each visitor segment table is aggregated so that one final value (i.e., resultant data 120) is stored in database 130 representing the characteristic information for each entire visitor segment. Continuing the current example, application software 360 would add all of the session-level total revenue figures for each segment and associate each sum with its corresponding visitor segment.

Once resultant data 120 is stored in database 130, application software 360 may disregard event-level data 100. All disregarded information from the log file may be either discarded or returned to the client website and not held within the system. Thus, only resultant data 120 is stored in database 130, where it is quickly accessed by a simple filter function for providing reports to clients on client-requested analysis for any visitor segment, as shown in FIGS. 7 and 9–16.

Client Interface

FIGS. 7–16 are screen shots illustrating a client interface, provided by analytics system 340, for viewing reports by client 320. In this particular embodiment, client 320 views reports on visitor activity at its website using the Internet Explorer web browser.

Figure 7:
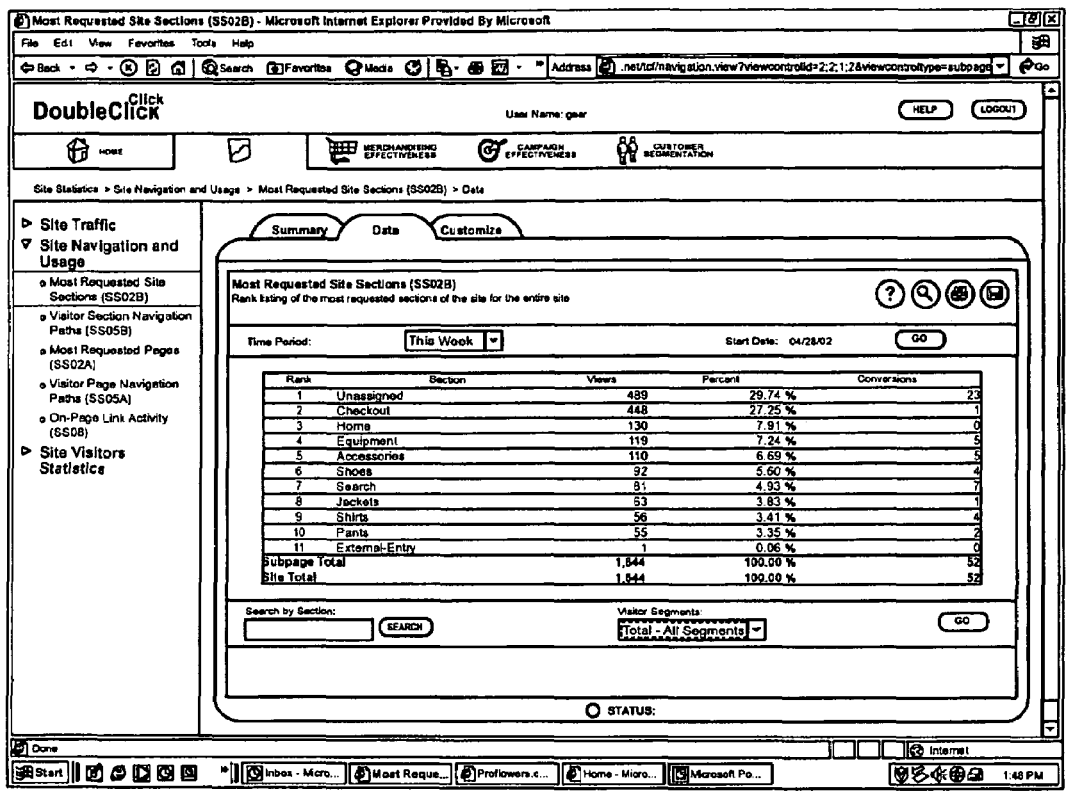
FIG. 7 is a screen shot of a Most Selected Site Sections analysis page in accordance with an embodiment of the present invention.
Figure 8:
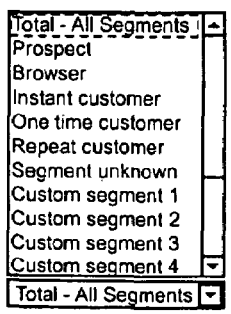
FIG. 8 is a screen shot of a pop-up list of visitor segments in accordance with an embodiment of the present invention.

In FIG. 7, client 320 views the Most Selected Site Sections analysis page, which displays a rank listing of the most requested sections of client 320's website for the current week. At the bottom middle area of the screen, client 320 may select a pop-up list marked visitor segments, which, when clicked (as fully shown in FIG. 8), displays each type of visitor for which the data may be presented to client 320. By selecting different visitor segments, client 320 not only measures how many people come to any one section of its website, but also understands how this measurement differs for different types of visitors. This tells client 320 where valuable customers spend their time on the site.

Note that because resultant data 120 for FIGS. 7 and 8–16 has already been stored according to each selectable visitor segment, analytics system 340 can nearly instantaneously display client-requested results upon selection of a visitor segment, without any re-evaluation of the original event-level data 100.

As represented by FIGS. 7 and 8–16, upon selection of a different visitor segment, analytics system 340 produces the requested data immediately, since that data is already stored according to its visitor segment in database 130. Thus, real-time calculation of event-level data 100 in response to a client request is replaced by a simple filter function on a pre-calculated sparse data set.

Figure 9:
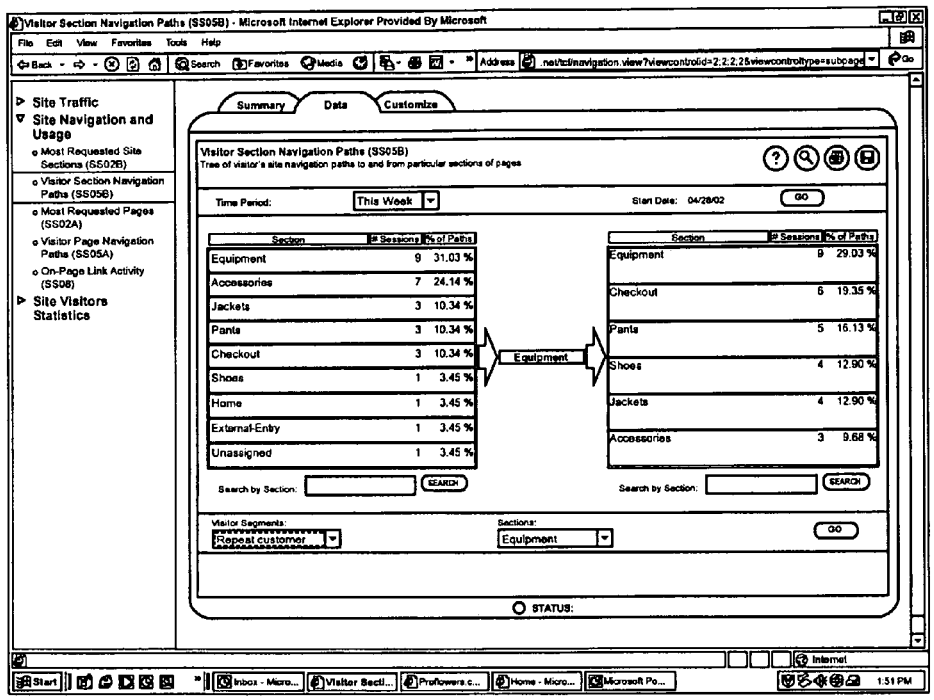
FIG. 9 is a screen shot of a Visitor Section Navigation Paths analysis page in accordance embodiment of the present invention.

In FIG. 9, client 320 views the Visitor Section Navigation Paths analysis page, which displays a tree of each visitor's site navigation paths to and from particular sections of pages for the current week. From this report, client 320 can determine not only how may repeat customers, for instance, use which section of its site, but also how repeat customers move through the site. This tells client 320 how to drive profitable traffic within its site.

Figure 10:
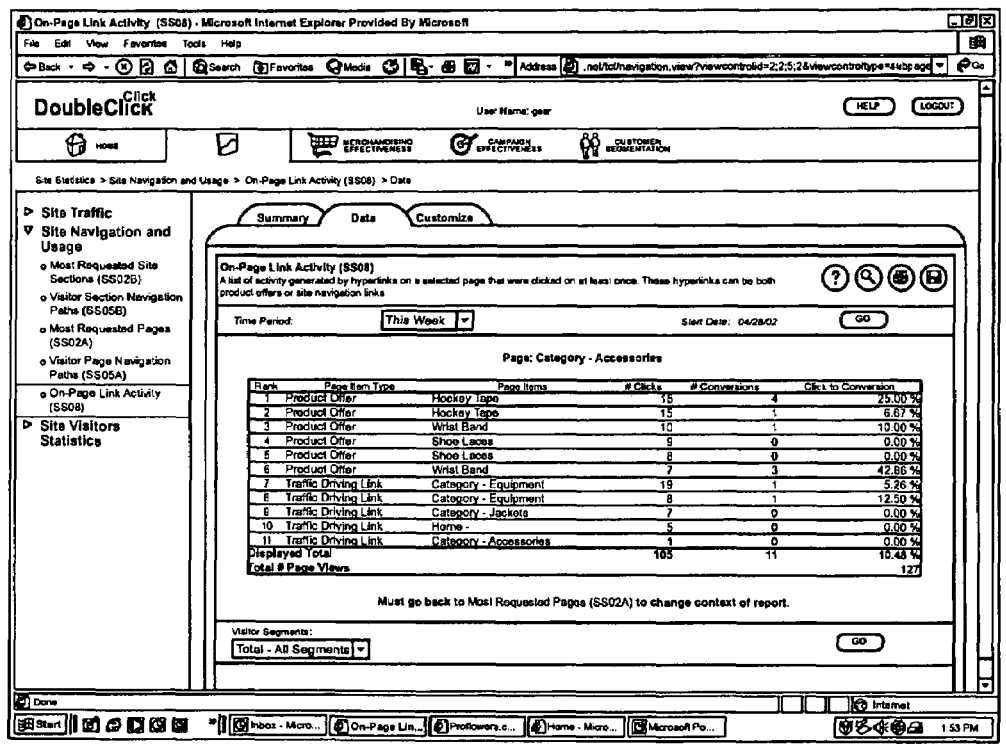
FIG. 10 is a screen shot of an On-Page Link Activity analysis page in accordance with an embodiment of the present invention.

In FIG. 10, client 320 views the On-Page Link Activity analysis page, which displays a list of activity generated by hyperlinks on a selected page that were clicked on at least once for the current week. These hyperlinks can be both product offers or site navigation links. This enables client 320 to see exactly how well product offers drive sales and onsite traffic driving links drive traffic.

Figure 11:
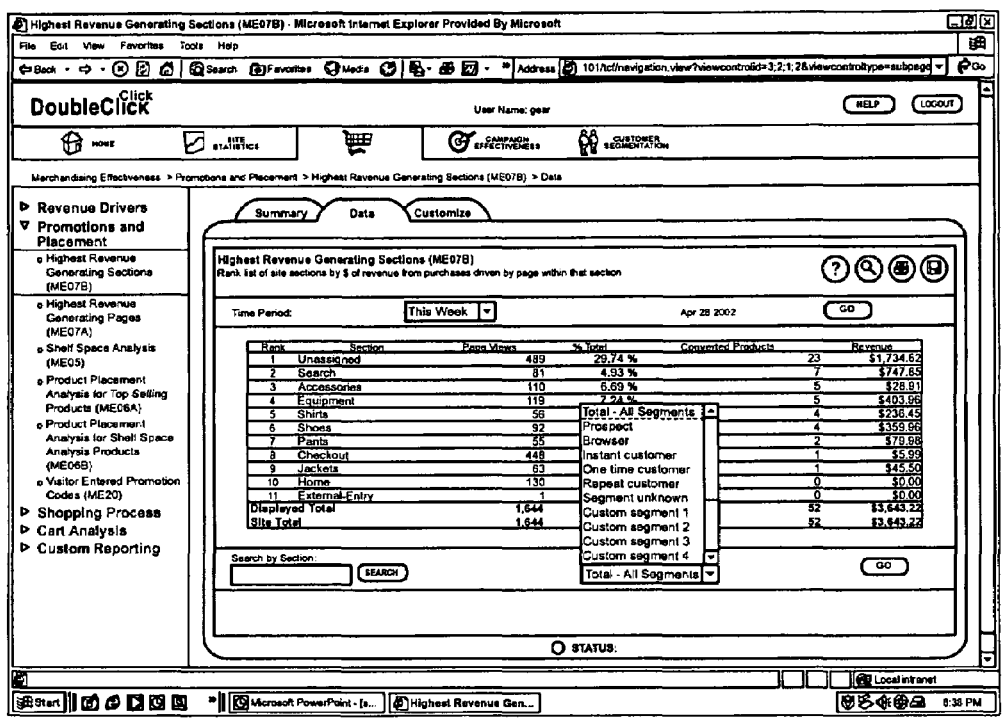
FIG. 11 is a screen shot of a Highest Revenue Generating Sections analysis page in accordance with an embodiment of the present invention.

In FIG. 11, client 320 views the Highest Revenue Generating Sections analysis page, which displays a rank list of site sections by dollar amount of revenue from purchases driven by a page within that section for the current week. This allows client 320 to see who is buying what where on the site, and if client 320 is adequately promoting the products or sections that, for example, repeat customers shop.

Figure 12:
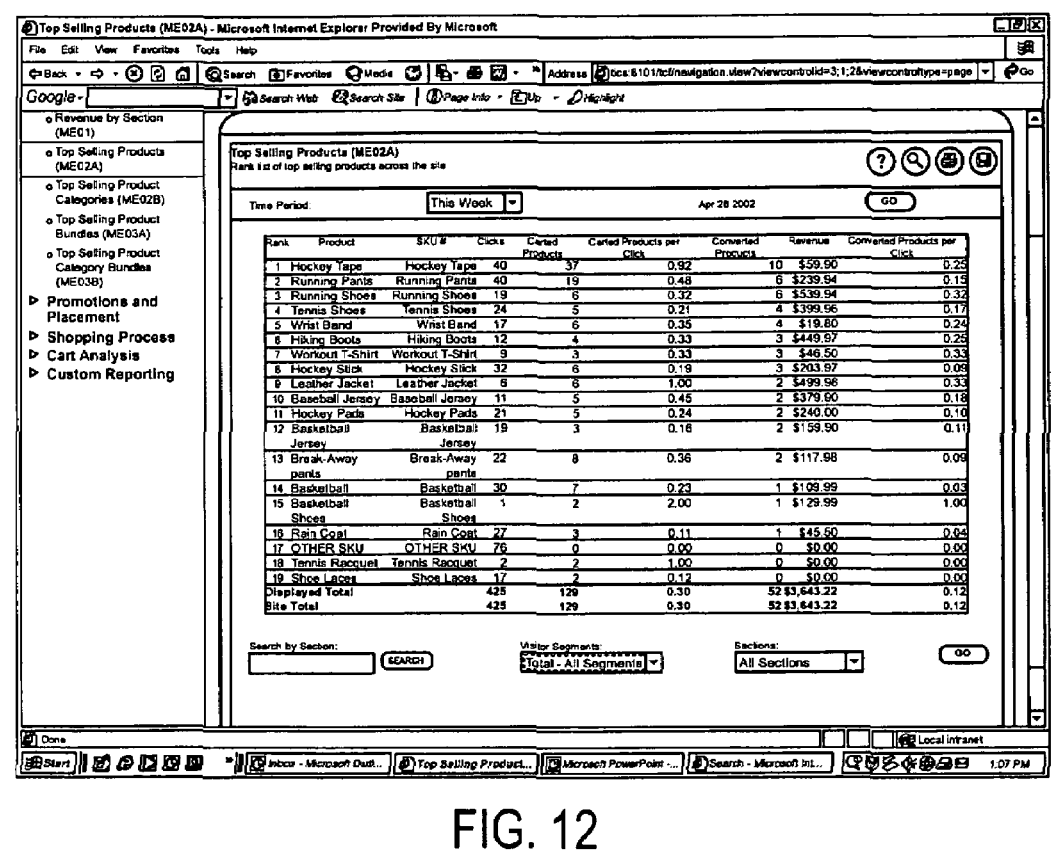

In FIG. 12, client 320 views the Top Selling Products analysis page, which displays a rank list of top selling products across the site for the current week. This shows client 320 not only what are the best sellers, but why or why not are they the best sellers. For example, lots of clicks but few carts could mean price is too high, whereas-lots of carts but few conversions could mean problems in the shopping process.

Figure 13:
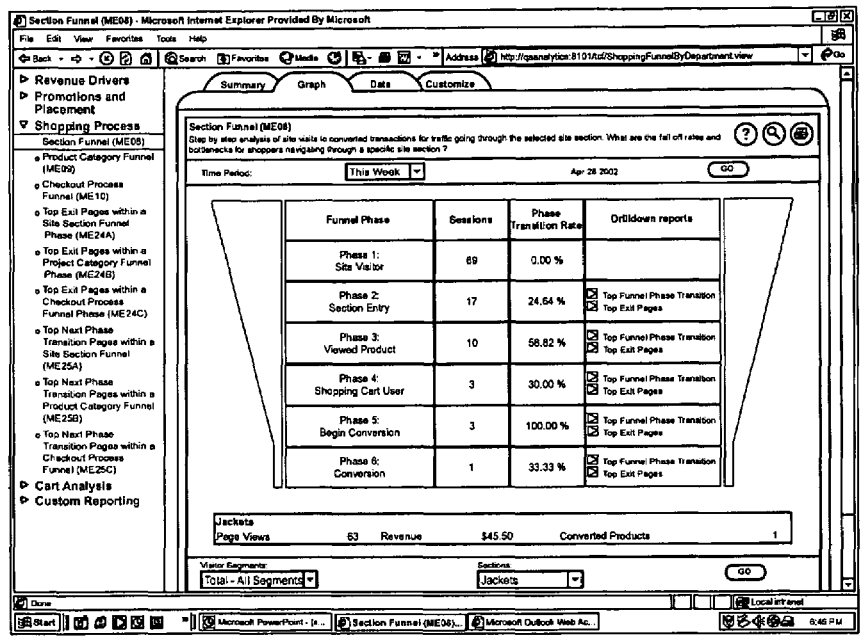
FIG. 13 is a screen shot of a Section Funnel analysis page in accordance with an embodiment of the present invention.

In FIG. 13, client 320 views the Section Funnel analysis page, which displays a step by step analysis of site visits to converted transactions for traffic going through the client-selected site sections for the current week. This aids client 320 in improving conversion rates by examining where in a customer's online travels does client 320 lose the customer, and if this measurement is different for other types of customer. This report is easily customized by client 320, as client 320 need only to place an additional key-value pair defining a particular phase number in an IMG tag on the particular page in the client-defined funnel.

Figure 14:
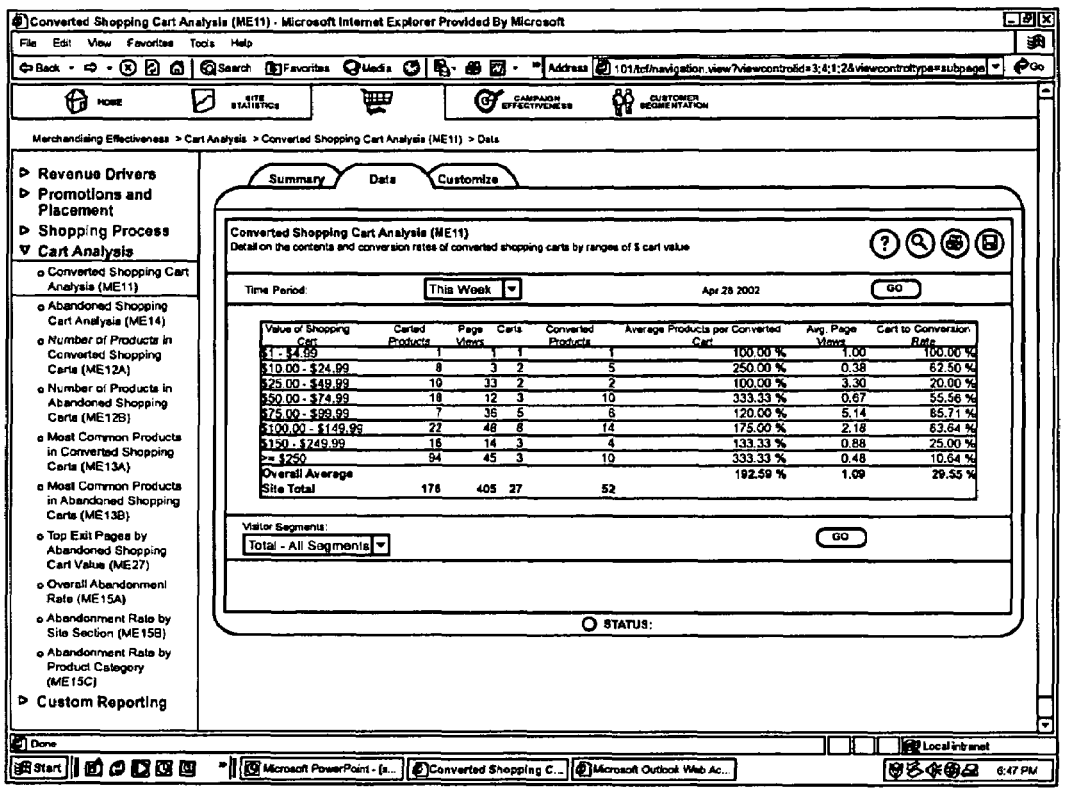
FIG. 14 is a screen shot of a Converted Shopping Cart Analysis page in accordance with an embodiment of the present invention.

In FIG. 14, client 320 views the Converted Shopping Cart Analysis page, which displays detail on the contents and conversion rates of converted shopping carts by ranges of dollar amount cart value for the current week. This shows client 320 who is spending how much. Instead of just measuring standard retail measures such as average order size and items per order, this report also enables client 320 to see if lumps of behavior exist at different spend levels, and whether repeat customers spend more than new customers, for example.

Figure 15:
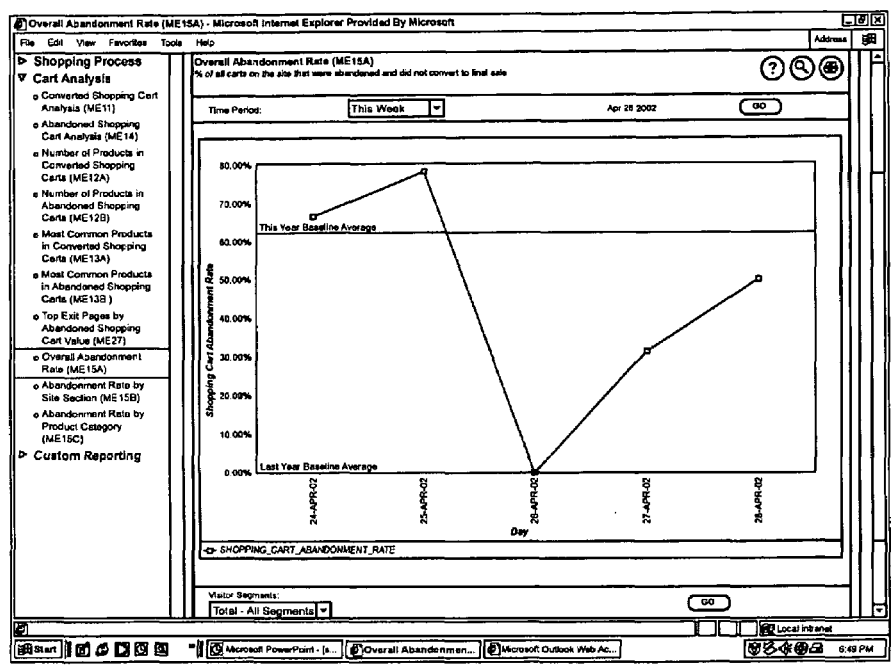
FIG. 15 is a screen shot of an Overall Abandonment Rate analysis page in accordance with an embodiment of the present invention.

In FIG. 15, client 320 views the Overall Abandonment Rate analysis page, which displays the percentage of all carts on the site that were abandoned and did not covert to final sale for the current week. Not only does this report establish what the abandonment rate is, but also who is driving the abandonments.

Figure 16:
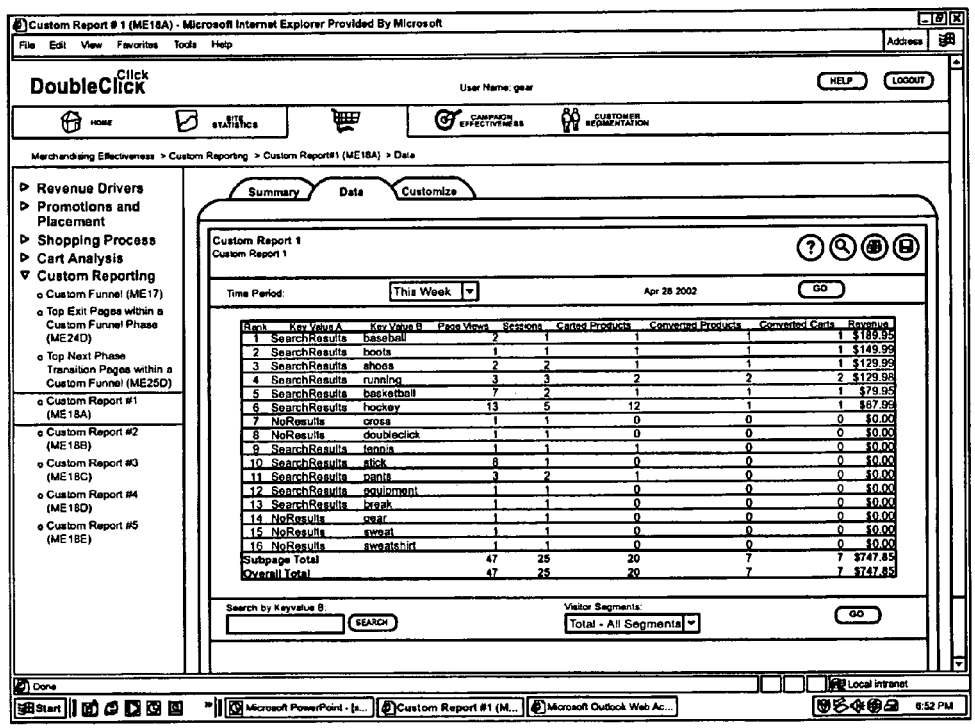
FIG. 16 is a screen shot of a Custom Report analysis page in accordance with an embodiment of the present invention.

In FIG. 16, client 320 views the Custom Report analysis page, which display a custom report for the current week. In this type of report, any values off any page can be analyzed, such as site search terms in this case. The report shows client 320 both what terms are entered and whether they result in a conversion or not. This report is easily customized by client 320, as client 320 need only to place an additional key-value pair defining the terms to be captured in an IMG tag on any particular page.

Several embodiments of the invention are specifically illustrated and/or described herein. However, it will be appreciated that modifications and variations of the invention are covered by the above teachings and within the purview of the appended claims without departing from the spirit and intended scope of the invention.

For example, embodiments of the invention can be applied to non-merchandising websites by capturing the metrics mapped to the navigation entities. Publishers interested in determining which ad space is valuable can use such metrics as ad exposures, advertiser hyperlink clicks, and website registration. Non-publishers interested in determining what applications and documents are accessed can use such metrics as application and documentation downloads.

Also, this invention can be applied to multiple client websites with distinct URLs by collating their respective data under one client as recognized by the system. By defining either individual sections for each distinct URL as a separate section or by defining the entire website entities as separate sections, the segmentation methodology would apply in a similar fashion as applied by the single client website embodiment described herein.

Additionally, with a number of clients with similar application of the system (e.g., selling furniture online, newspaper publishing website, etc.), reports can be provided to compare one client's metrics against an anonymous pool of other clients to determine its relative standing in the industry on several metrics.

What is claimed is:

1. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a web page viewed by at least one of the plurality of visitors on the client website.

2. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a web page from which at least one of the plurality of visitors on the client website places a product in a shopping cart.

3. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a website from where at least one of the plurality of visitors came before viewing a web page on the client website.

4. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a product clicked on by at least one of the plurality of visitors on the client website.

5. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a product placed into a shopping cart by at least one of the plurality of visitors on the client website.

6. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and providing online reports based on the stored aggregated information in response to a client-requested analysis of the event-level data, wherein the event-level data includes identification of a product purchased after being placed into a shopping cart by at least one of the plurality of visitors on the client website.

7. A method for analyzing website activity, comprising:

receiving event-level data representing session activity of each of a plurality of visitors on a client website;

determining, based on the event-level data, characteristic information associated with the session activity of each of the plurality of visitors;

determining, based at least in part upon the event-level data, membership of each of the plurality of visitors into at least one of a plurality of pre-defined visitor segments, each of the plurality of pre-defined visitor segments corresponding to a categorization associated with a type of visitor;

attributing the characteristic information to at least one of the plurality of pre-defined visitor segments based on the visitor segment membership of each of the plurality of visitors;

aggregating the attributed characteristic information according to visitor segment;

storing the aggregated information according to visitor segment prior to a client-requested analysis of the event-level data; and
providing online reports based on the stored aggregated information in response to a client-requested analysis of the event-level data,
wherein the event-level data includes identification of at least one of the plurality of pre-defined visitor segments associated with at least one of the plurality of visitors on the client website.

8. A method for analyzing website activity, comprising:
receiving event-level data representing session activity of each of a plurality of visitors on a client website;
determining, based on the event-level data, characteristic information associated with the session activity of each of the plurality of visitors;
determining, based at least in part upon the event-level data, membership of each of the plurality of visitors into at least one of a plurality of pre-defined visitor segments, each of the plurality of pre-defined visitor segments corresponding to a categorization associated with a type of visitor;
attributing the characteristic information to at least one of the plurality of pre-defined visitor segments based on the visitor segment membership of each of the plurality of visitors;
aggregating the attributed characteristic information according to visitor segment;
storing the aggregated information according to visitor segment prior to a client-requested analysis of the event-level data; and
providing online reports based on the stored aggregated information in response to a client-requested analysis of the event-level data,
wherein the characteristic information includes total number of web pages viewed.

9. A method for analyzing website activity, comprising:
receiving event-level data representing session activity of each of a plurality of visitors on a client website;
determining, based on the event-level data, characteristic information associated with the session activity of each of the plurality of visitors;
determining, based at least in part upon the event-level data, membership of each of the plurality of visitors into at least one of a plurality of pre-defined visitor segments, each of the plurality of pre-defined visitor segments corresponding to a categorization associated with a type of visitor;
attributing the characteristic information to at least one of the plurality of pre-defined visitor segments based on the visitor segment membership of each of the plurality of visitors;
aggregating the attributed characteristic information according to visitor segment;
storing the attributed aggregated information according to visitor segment prior to a client-requested analysis of the event-level data; and
providing online reports based on the stored aggregated information in response to a client-requested analysis of the event-level data,
wherein the characteristic information includes total number of products placed in a shopping cart.

10. A method for analyzing website activity, comprising:
receiving event-level data representing session activity of each of a plurality of visitors on a client website;
determining, based on the event-level data, characteristic information associated with the session activity of each of the plurality of visitors;
determining, based at least in part upon the event-level data, membership of each of the plurality of visitors into at least one of a plurality of pre-defined visitor segments, each of the plurality of pre-defined visitor segments corresponding to a categorization associated with a type of visitor;
attributing the characteristic information to at least one of the plurality of pre-defined visitor segments based on the visitor segment membership of each of the plurality of visitors;
aggregating the attributed characteristic information according to visitor segment;
storing the aggregated information according to visitor segment prior to a client-requested analysis of the event-level data; and
providing online reports based on the stored aggregated information in response to a client-requested analysis of the event-level data,
wherein the characteristic information includes total number of products purchased.

11. A method for analyzing website activity, comprising:
receiving event-level data representing session activity of each of a plurality of visitors on a client website;
determining, based on the event-level data, characteristic information associated with the session activity of each of the plurality of visitors;
determining, based at least in part upon the event-level data, membership of each of the plurality of visitors into at least one of a plurality of pre-defined visitor segments, each of the plurality of pre-defined visitor segments corresponding to a categorization associated with a type of visitor;
attributing the characteristic information to at least one of the plurality of pre-defined visitor segments based on the visitor segment membership of each of the plurality of visitors;
aggregating the attributed characteristic information according to visitor segment;
storing the aggregated information according to visitor segment prior to a client-requested analysis of the event-level data; and
providing online reports based on the stored aggregated information in response to a client-requested analysis of the event-level data,
wherein at least one of the plurality of pre-defined visitor segments includes repeat customers.

12. A method for analyzing website activity, comprising:
receiving event-level data representing session activity of each of a plurality of visitors on a client website;
determining, based on the event-level data, characteristic information associated with the session activity of each of the plurality of visitors;
determining, based at least in part upon the event-level data, membership of each of the plurality of visitors into at least one of a plurality of pre-defined visitor segments, each of the plurality of pre-defined visitor segments corresponding to a categorization associated with a type of visitor;
attributing the characteristic information to at least one of the plurality of pre-defined visitor segments based on the visitor segment membership of each of the plurality of visitors;
aggregating the attributed characteristic information according to visitor segment;

storing the aggregated information according to visitor segment prior to a client-requested analysis of the event-level data; and providing online reports based on the stored aggregated information in response to a client-requested analysis of the event-level data.

13. The method according to claim 12, wherein the characteristic information includes total revenue.

14. The method according to claim 12, wherein at least one of the plurality of pre-defined visitor segments includes one-time customers.

15. The method according to claim 12, wherein at least one of the plurality of pre-defined visitor segments includes prospective customers.

16. An apparatus for analyzing website activity, comprising:
- a processor; and
- a memory, coupled to the processor, storing instructions adapted to be executed by the processor to:
  - receive event-level data representing session activity of each of a plurality of visitors on a client website;
  - determine, based on the event-level data, characteristic information associated with the session activity of each of the plurality of visitors;
  - determine, based at least in part upon the event-level data, membership of each of the plurality of visitors into at least one of a plurality of pre-defined visitor segments, each of the plurality of pre-defined visitor segments corresponding to a categorization associated with a type of visitor;
  - attribute the characteristic information to at least one of the plurality of pre-defined visitor segments based on the visitor segment membership of each of the plurality of visitors;
  - aggregate the attributed characteristic information according to visitor segment;
  - store the aggregated information according to visitor segment prior to a client-requested analysis of the event-level data; and
  - provide online reports based on the stored aggregated information in response to a client-requested analysis of the event-level data.

17. An apparatus for analyzing website activity, comprising:
- means for receiving event-level data representing session activity of each of a plurality of visitors on a client website;
- means for determining, based on the event-level data, characteristic information associated with the session activity of each of the plurality of visitors;
- means for determining, based at least in part upon the event-level data, membership of each of the plurality of visitors into at least one of a plurality of pre-defined visitor segments, each of the plurality of pre-defined visitor segments corresponding to a categorization associated with a type of visitor;
- means for attributing the characteristic information to at least one of the plurality of pre-defined visitor segments based on the visitor segment membership of each of the plurality of visitors;
- means for aggregating the attributed characteristic information according to visitor segment;
- means for storing the aggregated information according to visitor segment prior to a client-requested analysis of the event-level data; and
- means for providing online reports based on the stored aggregated information in response to a client-requested analysis of the event-level data.

* * * * *